Figure 1:
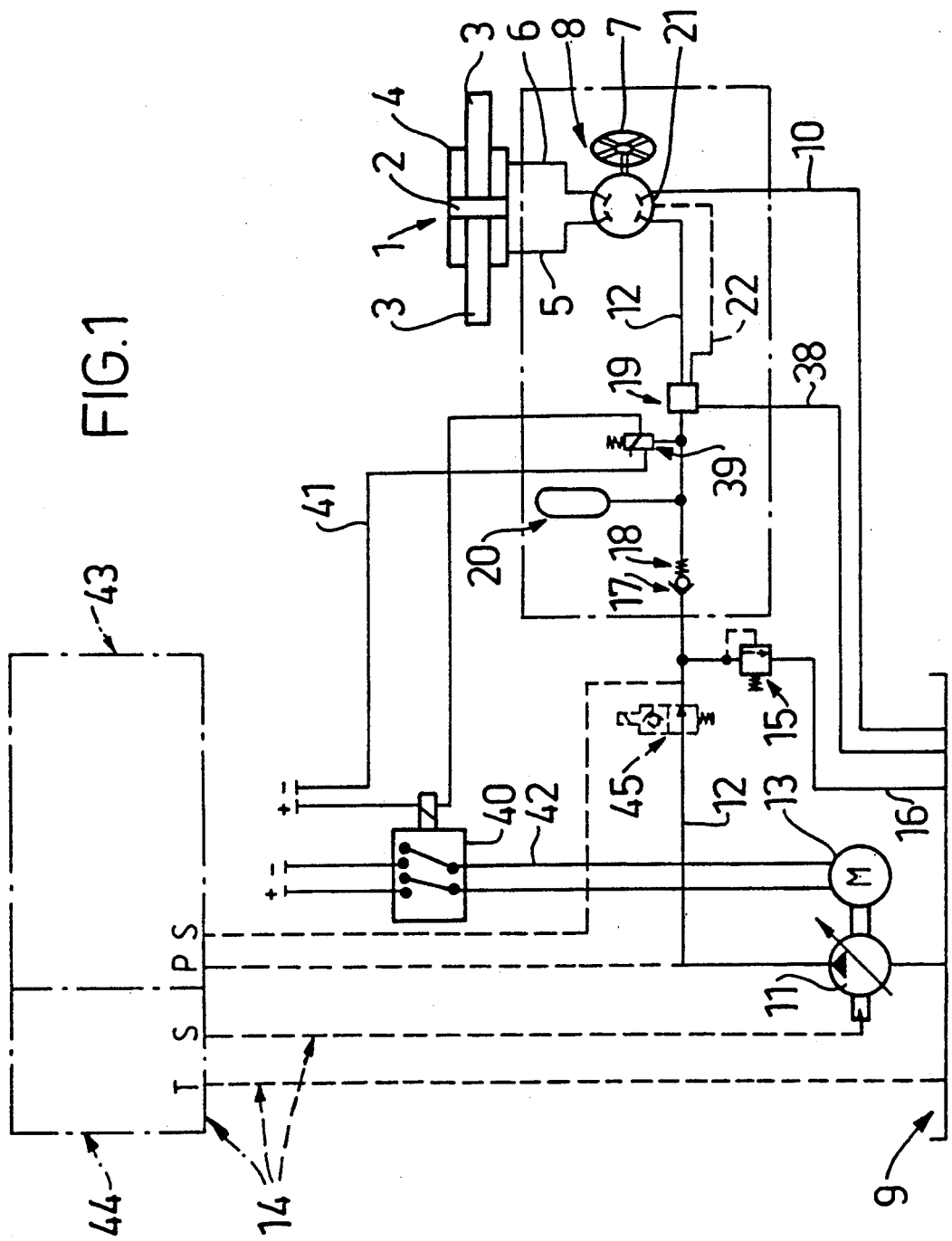

United States Patent [19]

Andersson et al.

[11] Patent Number: 5,022,482
[45] Date of Patent: Jun. 11, 1991

[54] HYDRAULIC STEERING SYSTEM FOR ELECTRICALLY DRIVEN MOTOR VEHICLES

[75] Inventors: Bo Andersson, Skellefteå; Anders Holmgren, Ursviken, both of Sweden

[73] Assignee: Bahco Hydrauto AB, Skellefteå, Sweden

[21] Appl. No.: 392,297

[22] Filed: Aug. 11, 1989

[30] Foreign Application Priority Data

Aug. 23, 1988 [SE] Sweden ................................ 8802957

[51] Int. Cl.$^5$ .............................................. B62D 5/00
[52] U.S. Cl. ........................................ 180/133; 60/418
[58] Field of Search ................... 180/132, 133; 60/418, 60/413, 384

[56] References Cited

U.S. PATENT DOCUMENTS

| 3,882,952 | 5/1975 | Crabb ................................ | 180/133 |
|---|---|---|---|
| 4,076,096 | 2/1978 | Hushower et al. ................ | 180/133 |
| 4,099,378 | 7/1978 | Shaffer ............................ | 60/418 |
| 4,326,558 | 4/1982 | Gage ................................ | 180/133 |
| 4,337,620 | 7/1982 | Johnson .......................... | 60/418 |
| 4,470,260 | 9/1984 | Miller et al. .................... | 180/132 |
| 4,723,412 | 2/1988 | Buschmann ...................... | 60/418 |
| 4,751,977 | 6/1988 | Cordiano ........................ | 180/132 |

FOREIGN PATENT DOCUMENTS 2204504  11/1988  United Kingdom ................ 180/132

*Primary Examiner*—Charles A. Marmor
*Assistant Examiner*—Alan M. Kagen
*Attorney, Agent, or Firm*—Burns, Doane, Swecker & Mathis

[57] ABSTRACT

A hydraulic control system for, e.g., electrically driven vehicles, comprising a hydraulic, double-acting steering piston-cylinder device which co-acts with a control unit which is actuable by means of a steering member, and which is connected to a hydraulic pump, driven by an electric motor, and to a tank, and which includes a control signal outlet through which a control signal is delivered for maintaining and interrupting the supply of steering hydraulic fluid to the steering-piston cylinder device. In order to enable the vehicle to be steered directly, even when the pump is not activated, an accumulator (20) is provided in the hydraulic connection (12) between the pump (11) and the control unit (8), at a location between a check valve (17) and a control vale (19) which prevent the flow of hydraulic fluid from the accumulator (20) and of which valves the valve located upstream of the accumulator (20) is intended to open in response to the control signal delivered by the control unit (8), this control signal constituting a pressure increase, so as to permit hydraulic fluid to flow from the accumulator (20) to the steering piston-cylinder device (1). The system also includes means (39, 40) operative to start the pump motor (13) upon the occurrence of a pressure decrease in the hydraulic connection (12) between the check valve 17 and the control valve 19, therewith to provide the requisite flow of hydraulic steering fluid through the action of the pump (11).

5 Claims, 2 Drawing Sheets

HYDRAULIC STEERING SYSTEM FOR ELECTRICALLY DRIVEN MOTOR VEHICLES

The present invention relates to a hydraulic steering system intended for electrically driven motor vehicles, machines and the like, and comprising a control unit which is operative to control a hydraulic double-acting piston-cylinder steering device and which is actuable by means of a steering member, e.g. a wheel or a steering stick, and which control unit is connected to a hydraulic pump driven by an electric motor, and to a tank or reservoir and has a control signal outlet which is operative in delivering a control signal for maintaining and interrupting the flow of hydraulic fluid to the piston-cylinder steering device.

Various different designs of hydraulic steering systems of this kind are known to the art. In one known system, often used in practice, the steering system includes a separate hydraulic pump which is driven by an electric motor and the sole function of which is to produce the flow of hydraulic fluid and the pressure requisite for steering the vehicle. So that the steerability of the vehicle is not lost, the pump motor is constantly connected for continuous operation of the hydraulic pump while the vehicle is in active use. This results, however, in an unnecessarily high consumption of electrical energy, which is an extremely negative circumstance, especially in respect of electrically driven vehicles which obtain their current supply from vehicle-carried batteries.

For the purposes of reducing the current consumption of this kind of vehicle, some such known steering systems are constructed so that the electric motor operative to drive the pump is not activated until the control unit itself is activated by the driver of the vehicle, with the aid of a wheel or control stick. As soon as the steering system is activated in this manner, it sends a control signal to a pressostat which in turn activates a relay, which in response thereto starts the electric motor of the hydraulic pump, therewith driving the pump so as to deliver hydraulic fluid to the double-acting steering piston-cylinder device and steer the vehicle in the direction determined by the driver through said wheel or steering stick. It will be evident from this that when the electric pump is deactivated, the steering system will not contain the requisite pump pressure for steering the vehicle and that consequently, when the driver manipulates the steering wheel or steering stick of this known steering system, to steer the vehicle in a desired direction, there will be no steering response in the system over the time lapse taken for the pump to build-up sufficient steering pressure, from the moment of manipulation of the steering wheel or steering stick by the driver. In other words, this known steering system does not alway effect steering of the vehicle in immediate response to the driver's manipulation of the steering wheel or steering stick, but that there is a time delay before steering takes effect. This constitutes a serious drawback, which needs to be overcome.

Accordingly, the object of the present invention is to overcome this drawback and to provide for electrically driven vehicles and machines a hydraulic steering system of the aforesaid kind which is so constructed that the system will respond to steer the vehicle or machine concerned immediately the steering wheel or steering stick is manipulated by the driver, i.e. in the absence of any delay, even in those instances when the electric motor operative in driving the hydraulic pump is switched off. A further object is to provide such a steering system which has a low energy consumption in operation and thereby assist in extending the operational life of the electrical energy source carried by this type of vehicle and machine, i.e. the batteries.

These objects are achieved with a hydraulic steering system having the characterizing features set forth in the following claims.

Figure 2:
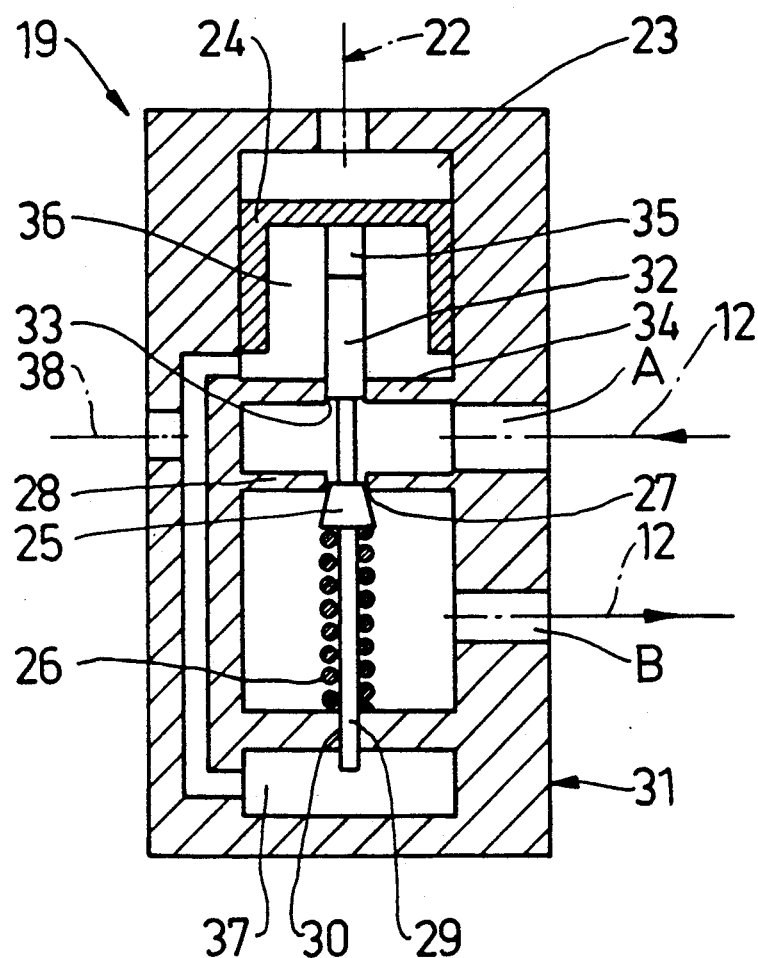

The invention will now be described in more detail with reference to the accompanying drawings, of which FIG. 1 illustrates schematically an exemplifying embodiment of an inventive steering system, and FIG. 2 is a sectional view of a pilot-controlled check valve included in said system.

In FIG. 1 the reference 1 indicates generally a hydraulic, double-acting steering piston-cylinder device which forms part of the inventive hydraulic steering system, intended preferably for electrically driven vehicles and machines, and which comprises a piston 2 and piston rods 3 which extend from said piston in mutually opposite directions. The respective cylinder spaces 4 located on respective sides of the piston 2 communicate through a respective conduit 5, 6 with a control valve or control unit 8 which is actuable by means of the vehicle steering wheel 7 or steering stick. The control unit may, for instance, be of the kind retailed on the market under the trade mark "ORBITROL" and including a hydraulic motor of the kind "ORBIT", the vehicle steering wheel 7 or steering stick being connected to the output shaft of said motor. The control unit 8 is also connected to a tank 9, through a conduit 10, and to a hydraulic pump 11 through a conduit 12. The pump is driven by an electric motor 13, to which current is supplied from an energy source in the form of electric batteries carried by the vehicle. The pump 11 may be a fixed or variable displacement pump with flow in one direction and may also be used as a pressure source for all hydraulic functions and facilities with which the vehicle or machine concerned is equipped, as indicated by broken lines 14. If desired, however, the pump may function solely as a pressure source for the steering system.

The inventive steering system also includes a direct-control by-pass or overload valve 15 which is mounted in the conduit 12 and which when the pressure in the inlet exceeds a given predetermined value, opens to discharge the flow of hydraulic fluid to the tank 9, through a conduit 16. Located downstream of the by-pass valve 15 is a check valve 17 which opens the conduit 12 at a pressure determined by a spring 18, this pressure being lower than the pressure required to release the by-pass valve. The check valve 17 is thus operative to prevent fluid from flowing away from the control unit 8, which function can also be achieved with a check valve with no spring 18.

Flow is prevented in the opposite direction by a control valve 19 mounted in the conduit 12, between the control unit 8 and the check valve 17. Located between the check value 17 and the control valve 19 is an accumulator 20, which can be charged to the pressure intended, provided that the control valve 19 is held closed.

Remote control of the remotely controlled check valve 19 is achieved by connecting the valve to a pressure signal outlet 21 on the control unit 8, via a conduit 22 which opens into a pilot valve chamber 23 in the control valve 19 (FIG. 2) and in which there is generated a pressure increase, which functions as a signal, immediately the steering wheel 7 is manipulated by the driver, in either direction. This pressure increase is transmitted, through the conduit 22, to the pilot valve chamber 23 and there acts on a piston 24 located in said chamber. The piston area of the piston 24 is several times larger than the area of a frustro-conical valve body or plug 25, which plug is actuable by said piston and in the closed position of the control valve 19 is held by a spring 26 in abutment with a valve seat 27 provided in a partition wall 28 between the control valve inlet A, connected to the conduit 12 extending from the pump 11, and the control valve outlet B, connected to the conduit 12 extending to the control unit 8. The control valve spring 26 surrounds a guide pin 29, which is guided in a hole 30 provided in a wall of the control valve housing 31. Provided on the other side of the valve plug 25 is a guide pin 32 which is guided in a hole 33 formed in a wall 34 which partitions the pilot valve chamber 23. The part of the guide pin located in the hole has a diameter which is equal to the top diameter of the frustro-conical valve plug, whereas the intermediate parts of said pin have a smaller diameter, whereby the forces deriving from the pump or accumulator pressure and acting counter-directionally on the valve plug and its guide pin 32 cancel out each other when the valve plug is in its valve closing position. In order to move the valve plug 25 from its seating 27, so as to open the control valve 19, it is only necessary to overcome the force exerted by said spring, which is readily achieved by the pilot valve piston 24 of large area, even in response to very small pressure increases in the pilot valve chamber 23.

The piston 24 lies against the guide pin 32 of the valve plug through the intermediary of a peg 35 and as soon as the piston 24 is subjected to said signal-functioning pressure increase, the piston moves immediately towards the valve plug 25 and opens the valve 19, whereby the control valve 19 permits hydraulic fluid to pass therethrough and to the control unit 8, and therewith also to the steering piston-cylinder device 1, so as to steer the vehicle in the intended direction. Since internal leakage can occur in the control valve 19, through the holes 30,33 accommodating the guide pins 29,32, the space 36 behind the piston 24 and also a space 37 into which the valve-plug guide pin 29 extends are connected directly to the tank 9 through a conduit 38, so as to prevent the occurrence of counter-pressure. The occurrence of counter-pressure would jeopardize the ease and speed at which the valve 19 opens.

For a more detailed explanation of the method of operation of the inventive steering system, it is assumed that the accumulator 20 is charged to a pressure which is equal to the pre-determined pressure at which the by pass valve 15 comes into operation, and that both the electric motor 13 and the pump 11 are switched off. The smallest movement of the wheel 7 in either direction will result in the generation of a pressure increase in the pressure signal outlet 21 of the control unit, this pressure increase being transmitted directly to the pilot valve chamber 23, where it causes the piston 24 to move towards the valve plug 25 of the control valve 19, thereby to open the valve and permit hydraulic fluid to flow from the accumulator 20 to the control unit 8 and therewith to the steering piston-cylinder device, whereby steerability is achieved immediately, even though the electric motor 13 and the pump 11 are switched off.

When the pressure in the conduit 12 between the accumulator 20 and the remotely controlled or steered control valve 19 falls beneath a given predetermined level, there is activated a pressure monitor 39, pressostat or pressure switch having alternating electric contacts, which is operative in starting the electric motor 13, via a relay 40, and therewith drive the pump 11 so as to deliver hydraulic fluid to the steering piston-cylinder device 1 and therewith provide the requisite steering pressure, for as long as this hydraulic steering facility needs to be in function for steering of the vehicle. When this facility is not needed, the control unit 8 is not activated and no pressure signal is sent to the control valve 19, resulting in closure of the valve and enabling the accumulator 20 to be charged automatically to a pressure determined by the pressure to which the pressure monitor or pressostat is set, this latter pressure being slightly lower than the pressure setting of the by-pass valve 15. When only one pressure monitor 39 or pressostat is used, as in the case of the illustrated embodiment, the pressure monitor or pressostat shall incorporate a hysteresis of such magnitude as to afford the requisite working range - upper and lower pressure limits - to the accumulator circuit. Otherwise, two pressure monitors 39 are used.

When the pressure in the conduit 12 between the accumulator 20 and the control valve 19 corresponds to the pressure at which the pressure monitor 39 is activated, the pressure monitor is again activated and breaks the electric circuit 41 to the relay 40, therewith interrupting the flow of current through the circuit 42 to the pump motor 13, thereby switching off the motor 13 and stopping the pump. One of the pressures at which the pressure-monitor is activated is suitably the pressure to which the by-pass valve is set, therewith activating the pressure monitor approximately at the same time as the control valve 19 is opened, and permitting hydraulic fluid to flow from the accumulator 20.

As previously mentioned, the pump 11 and the pump motor 13 can also be used to serve other hydraulic facilities incorporated in the vehicle or machine concerned. In this case the system will include the conduits 14 shown in broken lines and extending to and from a switching or directional valve 43, shown schematically in FIG. 1, for effecting the functions of said facilities, e.g. lifting, tilting etc. In this case there is preferably provided a priority valve 44 which will ensure that the hydraulic-flow and pressure requirements of the vehicle steering system are satisfied in priority to said other hydraulic facilities. Should any of the other hydraulic facilities require a higher operating pressure than that required by the hydraulic steering facility, the conduit 12 leading to the control unit 8 is preferably blocked downstream of the by-pass valve 15, so as to save the pump from unnecessary work. This blocking function is suitably effected by an on/off-type valve 45 which is normally open and which is closed remotely by said priority valve, to block the conduit 12. The priority valve also ensures, at the same time, that the motor relay 40 is activated so that the requisite current is supplied to the motor 13.

It will be understood that the invention is not restricted to the aforedescribed and illustrated embodiments and that modifications can be made within the scope of the inventive concept as defined in the following claims.

We claim:

1. A hydraulic steering system for electrically driven vehicles and machines including a hydraulic double-acting piston-cylinder steering device, and a control unit which controls said piston-cylinder device and which is actuable by a steering member, said control unit being connected to a hydraulic pump which is driven by a motor, and to a tank, and being provided with a control signal outlet which delivers control signals to maintain and to interrupt the supply of hydraulic steering fluid to the steering piston-cylinder device, wherein a accumulator is provided in a hydraulic connection between the pump and the control unit between a control valve and a check valve which when closed prevent hydraulic fluid from flowing from the accumulator, said control valve being located downstream of the accumulator and opening in response to a control signal delivered from the control unit in the form of a pressure increase, irrespective of the accumulator pressure and the pump pressure, so as to permit hydraulic fluid to flow to the steering piston-cylinder device from the accumulator, said steering system including means for starting the motor of the pump in response to a pressure decrease in said hydraulic connection between said control valve and said check valve to thereby maintain a requisite hydraulic flow for steering purposes to the steering piston-cylinder device through the action of said pump.

2. A system according to claim 1, wherein said means for starting the pump rotor includes a pressure monitor and a relay controlled by said pressure monitor to close a current supply circuit of the motor.

3. A system according to claim 1, wherein said hydraulic connection leading to the control unit includes a closing valve which is normally held open but which closes when an intended accumulator pressure is reached, so that said hydraulic pump and said motor may supply hydraulic fluid to other hydraulic systems of the vehicles or machine.

4. A system according to claim 1, wherein a valve plug of said control valve includes a surface which faces towards said valve plug and which has an area substantially equal to the area of said plug, said surface counterbalancing and cancelling out the force of a pressure on said valve plug.

5. A system according to claim 4, wherein said surface is connected to a pilot piston which is subjected to said pressure increase of said control signal to open said control valve.

* * * * *